(12) United States Patent
Gommper et al.

(10) Patent No.: US 6,725,558 B2
(45) Date of Patent: Apr. 27, 2004

(54) ADJUSTABLE TOOL GUIDE

(76) Inventors: Brion Gommper, W. 399 N. 6098, Lac La Belle Dr., Oconomowoc, WI (US) 53066; Rex Pew, 717 Aspen St., South Milwaukee, WI (US) 53172

( * ) Notice: Subject to any disclaimer, the term of this patent is extended or adjusted under 35 U.S.C. 154(b) by 0 days.

(21) Appl. No.: 10/157,606

(22) Filed: May 29, 2002

(65) Prior Publication Data

US 2003/0221329 A1 Dec. 4, 2003

(51) Int. Cl.[7] .................................................. B43L 7/12
(52) U.S. Cl. ................................ 33/640; 33/42; 33/471; 33/464
(58) Field of Search .............................. 33/640, 42, 452, 33/464, 465, 466, 468, 470, 471, 473, 613, 626, 628, 630, 430, 435, 438, 443, 418, 419, 424, 425

(56) References Cited

U.S. PATENT DOCUMENTS

| | | | | | |
|---|---|---|---|---|---|
| 2,719,548 | A | * | 10/1955 | Mitchell | 33/465 |
| 2,773,523 | A | * | 12/1956 | Hopla | 33/403 |
| 4,125,942 | A | * | 11/1978 | Horner et al. | 33/430 |
| 4,281,572 | A | * | 8/1981 | Stovall | 33/443 |
| 4,483,071 | A | * | 11/1984 | te Kolste | 33/42 |
| 4,607,434 | A | * | 8/1986 | Francis | 33/42 |
| 4,611,407 | A | * | 9/1986 | van Gorp | 33/471 |
| 4,901,444 | A | * | 2/1990 | Maschmeier | 33/423 |
| 5,472,029 | A | * | 12/1995 | Ketch | 33/456 |

* cited by examiner

*Primary Examiner*—Christopher W. Fulton
(74) *Attorney, Agent, or Firm*—Smith & Amundsen

(57) ABSTRACT

An adjustable portable power tool guide having a base plate, a base plate cutting edge to define a cut line, an adjustable tool guide rail for guiding a portable power tool cutter adjacent to the cutting edge, and an adjustable control bar that defines a reliable and predetermined angle between the cutting edge and the control bar.

4 Claims, 4 Drawing Sheets

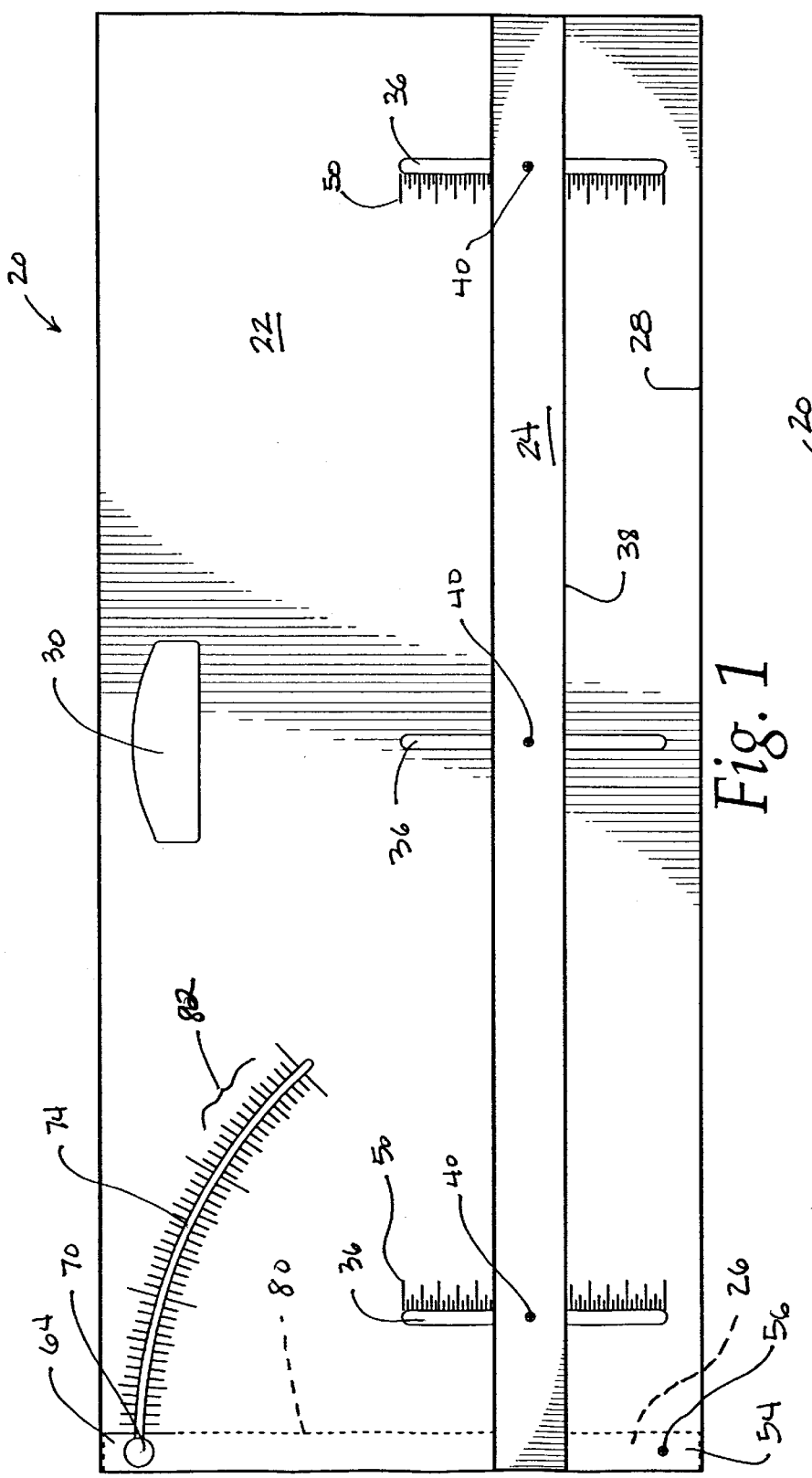
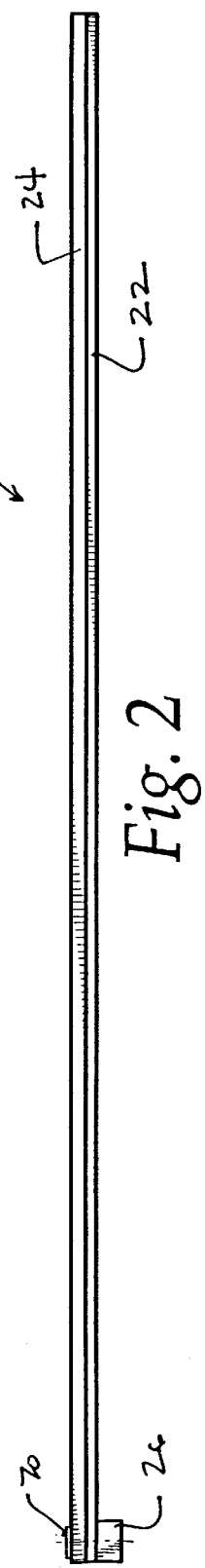
Fig. 1
Fig. 2

ADJUSTABLE TOOL GUIDE

FIELD AND BACKGROUND OF THE INVENTION

This invention relates generally to tool guides, and more particularly to an adjustable tool guide that provides accurate set up and guide placement to reduce the time necessary to perform cutting or milling operations by a variety of hand-held power tools.

In woodworking, there are a variety of guides that provide a secure surface on which the edge of a hand-held power tool can slide as it is moved through a cutting or milling operation. These guides can be used to trim large panels or other sheet material. For example, doors are typically manufactured over-sized and trimmed to fit a given door opening in a wall. Carpenters spend considerable time measuring the size and squareness of the opening and then trimming the door to match.

Cutting the door with a circular saw is common practice, and skilled carpenters can cut to a pencil or scribe line marked on the door. Yet even skilled carpenters do not make flawless cuts, and circular saws can cause chipping and splintering of the door. Further, running the platen of the circular saw across a door can cause scratches or other blemishes that must be repaired.

Tool guides can be used to ensure the cut is straight. For example, a product known as Clamp-N-Guide is an aluminum extrusion that incorporates a clamping mechanism to secure it to a flat surface such as a panel or a door. The edge is straight, so a carpenter sets the guide at a distance from the desired cut location so that the spacing from the guide to the cut line equals the spacing from the tool's edge to the saw blade or router bit. Once set, the tool can be operated along the guide's edge to cut a line at the desired location. One of this device's shortcomings is that the guide must be placed at an exact distance from the cut line and that distance varies from tool to tool. Thus, a carpenter must measure the tool and set both ends of the guide at the appropriate distance. This requires careful set up and possibly some trial and error testing to ensure accuracy. Further, using an edge guide of this type provides no protection against splintering of the wood or marring of the surface from the tool's base plate.

This regimen of set-up, testing, and cutting must be completed every time a separate cut is made. On cuts that are uniformly 90° square with adjacent edges it is time-consuming and, if performed inaccurately, leaves a very obviously flawed cut.

Cuts that are greater or less than 90° to adjacent edges require an even greater amount of set up time because different guide-to-cutting edge calculations must be made for each end of the guide.

There are so-called compass guides that can be adjusted to guide a tool at a variety of angles relative to the edge of a board. These guides are short and can only be used to cut framing lumber. Further, these guides still require the carpenter to calculate the distance from the guide edge to the tool's cutting edge for accurate guide placement. Further, a compass guide provides little protection against marring of a surface by the tool as it is pushed along the guide.

One prior art tool guide that has been used, but not mass-marketed, includes a flat base panel, an edge bar, and a tool rail. The panel is first cut by its associated power tool by passing the tool along the tool rail to define a base panel edge that corresponds exactly to the distance from the tool rail to the cutting edge of the tool. This permits the guide to be placed with its cut edge on the exact line of the intended cut. The base plate also protects the piece to be cut from being marred by the sliding tool base.

As a further advantage of this type of tool guide, the edge bar can be placed against an adjacent edge of the piece to be cut. With the cut edge of the base plate set on a single point of the intended cut line, the tool guide will control the tool to cut a line that is at a right angle to the edge bar. In this manner, doors or panels can be cut square with minimal set up or measurement.

This type of tool guide is essentially limited to making right angle cuts. It is also necessary to have a different tool guide for each tool that may be used to make a cut because its base plate's cut edge is unique to match the spacing of the tool rail and cutter for that particular tool. If different tools are used or different cutters (such as different diameter router bits) on the same tool, the cut edge of the base plate will not define a true cut line. This requires calculating the appropriate spacing from the guide to the cut line or a new guide must be used. Either way, the value of such a guide is diminished when a variety of tools are used with it.

Thus, there is a need for a tool guide that can be used with a variety of different tools and cutter sizes to minimize set up and calculations, and give accurate cuts at a variety of angles relative to adjacent edges.

SUMMARY OF THE INVENTION

A tool guide in accordance with the present invention requires little effort to set up and use. It provides accurate guidance for a tool along a desired cut line and eliminates scratch damage to the material being cut. The tool guide of the present invention also reduces splintering of the material being cut. Downward pressure by the hand-held power tool and guide supports wood fibers at the cut line, thereby preventing or reducing splintering.

The tool guide of the present invention includes a base plate, an adjustable tool guide rail, and a pivoting edge control bar. The base plate defines the cut line for the tool and protects the material being cut, as described above.

The adjustable tool guide rail can be moved relative to the edge of the base plate so that tools of various sizes can be used with the guide.

The pivoting control bar can be set at right angles to the base plate edge or at angles to the base plate edge to provide accurate and consistent cut line angles without the need to calculate the resulting dimensions of the material to be cut.

BRIEF DESCRIPTION OF THE DRAWINGS

FIG. 1 is a top view of an adjustable tool guide in accordance with the present invention.

FIG. 2 is a side view of the tool guide illustrated in FIG. 1.

DETAILED DESCRIPTION OF THE DRAWINGS

Figure 3:
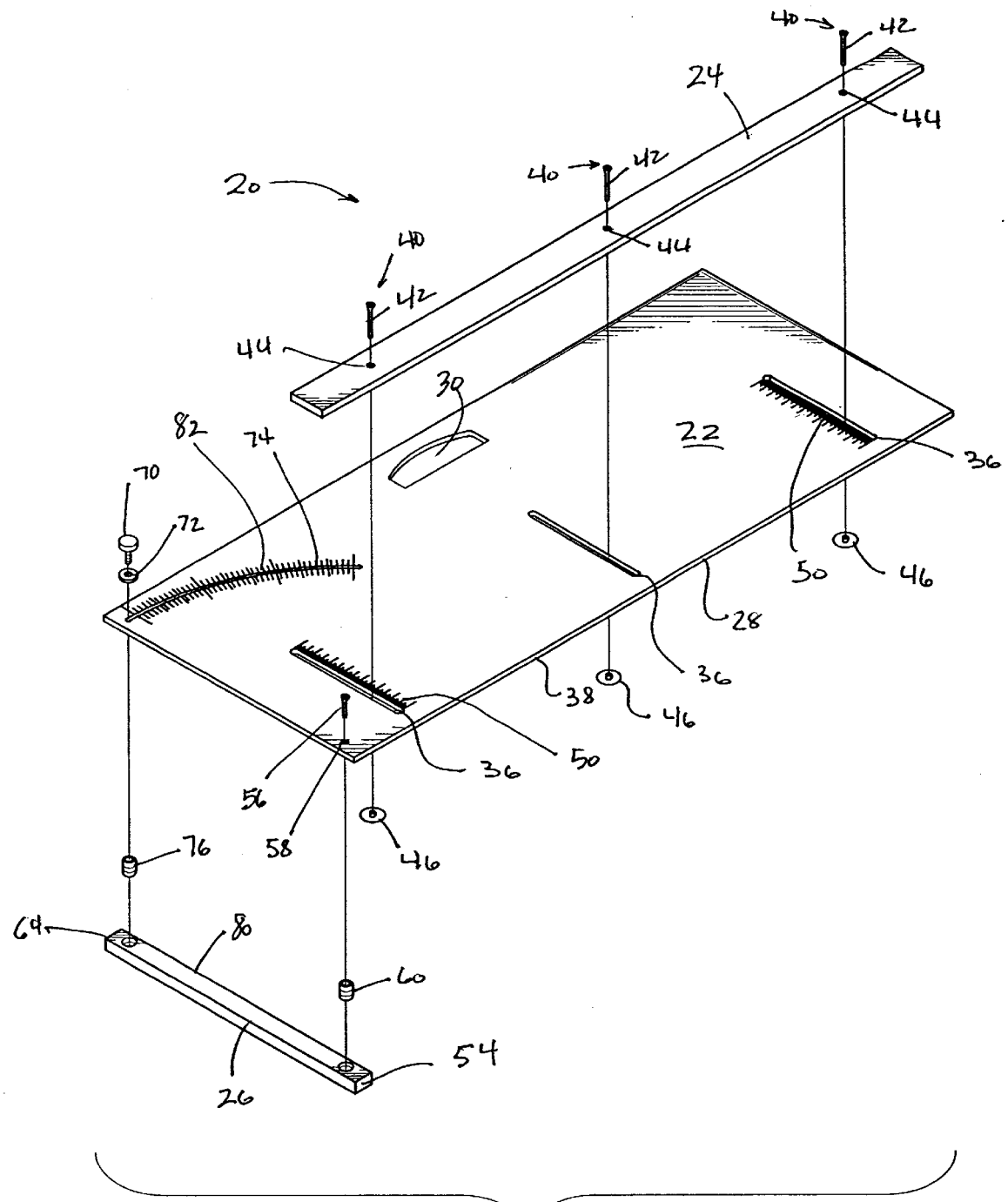
FIG. 3 is an exploded prospective view of the tool guide of FIG. 1.

In the following detailed description of the drawings, the same reference numeral will be used to identify the same element in each of the figures.

Illustrated generally in FIG. 1, is a tool guide 20 in accordance with the present invention. The tool guide 20 includes a base plate 22, an adjustable tool rail 24, an adjustable control bar 26, a cutting edge 28, and a cut-out handle 30. This adjustable tool guide 20 can be used with any number of tools to accurately cut along a line at any desired angle relative to the control bar 26.

The base plate 22 is illustrated in its preferred shape of a rectangle having a cutting edge 28 that is longer than the control bar 26. Other shapes and relative dimensions can be used in accordance with the present invention. For safety reasons, a preferred embodiment has a depth of 15¾" to provide a user with ample surface area on which to place his hand to stabilize the guide during use and also maintain his hand at a safe distance from the tool. The base plate 22 is preferably made of a lightweight, yet durable, non-marring and non-splintering material such as a foam-based plastic sold under the trademark Celtec.

The base plate 22 must withstand abuse in shops and on the job sites where it will be in constant use. It should resist damage from impact and be impervious to water. It should also not be subject to shrinkage or swelling from changes in humidity. The base plate 22 must provide its user with confidence that its dimensions are consistent and reliable. Few, if any, adjustments should ever be required for any reason other than the intended adjustments described below.

In addition, the base plate 22 should be easily manufactured with ordinary machining tools and not be subject to splintering or require special manufacturing processes.

Finally, the base plate 22 must provide a protective shield for the material being cut so that scratching and marring of the surface by the tool being pushed across the guide 20 is prevented.

The base plate 22 also includes at least one, and preferably three, adjustment slots 36 that enable the tool guide rail 24 to be adjusted relative to the cutting edge 28. The side 38 of the tool guide rail 24 closest to the cutting edge 28 is set at the precise dimension defined by the edge of a power tool and the rotating cutter on the power tool. With such an adjustment, the cutting edge 28 of the base plate 22 will accurately define the cut line that the tool will follow along the edge 38.

To make adjustments in that spacing, the tool guide rail 24 is joined to the base plate 22 with fasteners 40 that can be alternately loosened and tightened. Preferably, there are three such fasteners 40 to provide a secure connection that will resist tool motion vibration and pressure from the power tool running along the edge 38.

The fasteners 40 are illustrated in FIG. 3 as screws 42 that pass through holes 44 in the tool guide rail 24 and the adjustment slots 36 to be secured to tee-nuts 46 that are sized larger than the width of the slots 36. The tee-nuts 46 preferably are seated in a recess (not illustrated) that runs adjacent and parallel to each slot 36 to ensure that the base plate 22 will lie flat on any material surface to be cut.

Like the base plate 22, the tool guide rail 24 must resist damage, dimensional swelling, bowing, and any other change that would adversely affect the accuracy of its guiding function. Preferably, the tool guide rail 24 is made of high-density polyethylene ("HDPE"). Also, the tool guide rail 24 is preferably of a color that contrasts with the base plate 22 color so that its edge 38 is readily visible in use, such as the contrast between a black rail 24 and red base plate 22.

To aid in setting the edge 38 of the tool guide rail 24 at the proper spacing, there are gradations 50 adjacent to at least one, and preferably two adjustment slots 36. The gradations 50 should be marked on the base plate 22 in a manner that resists obliteration from moving power tools. Preferably, the gradations 50 are based on an inch scale with eighth-inch precision. Suitable forms of marking the gradations 50 include silk screening that is colored to contrast with the base plate's 22 color.

As illustrated, the outside adjustment slots 36 are matched with gradations 50, and the gradations 50 are marked to the interior side of the slots 36 to make them more readily visible as the tool guide rail 24 is being adjusted. Sight lines from the center of the cutting edge 28 outwardly to the exterior sides of the adjustment slots 36 will be at least partially obscured as the fasteners 40 are manipulated. Thus, the position of the gradations 50 to the interior side of the adjustment slots 36 is preferred.

The control bar 26 is joined on the backside of the base plate 22, as illustrated in FIGS. 1, 3, 4, and 5. In this configuration, the base plate 22 can be placed on a surface to be cut and the tool guide rail 24 will be accessible on the top and the control bar 26 will be disposable against an edge of the material to be cut, as is apparent in FIG. 2.

The control bar 26 is joined to the base plate 27 in a manner that permits the control bar 26 to be pivoted from a right angle to any acute angle relative to the cutting edge 28. As a practical range of orientations, the control bar 26 can be adjustable from a right angle (FIGS. 1, 2, and 4) to an acute angle (FIG. 5) of about 45°.

To make such a connection, the control bar 26 is pivotally joined at its lower end 54. A screw 56 extends through a hole 58 and into a threaded insert 60 in the lower end 54 of the control bar 26.

At an upper end 64 of the control bar 64, the connection is made with a thumb screw 70 extending through a washer 72, an arcuate slot 74, and into a threaded insert 76 in the control bar 26 upper end 64.

An inner edge 80 of the control bar 26 is visible through the arcuate slot 74, and defines the angle relative to the cutting edge 28. The inner edge 80 is adjusted to the desired angle by gauging it against angle gradations 82 that are arranged similar to a compass. One degree gradations are adequate in the preferred embodiment. The angle gradations 82 are preferably marked on the base plate 22 in much the same manner as the adjustment slot gradations 50 discussed above.

The control bar 26 could be positioned on either side of the base plate 22 or two can be used with one on each side, particularly on longer embodiments that can be as long as eight feet, if desired. Further, when two control bars are used, they can include a mechanism to urge them toward one another to clamp the guide 20 to the piece being cut. A cam, spring, threaded member, or other mechanism would be suitable to urge one or both control bars toward the other. Further, it may be desirable to have the pivoting lower end 54 joined to the base plate 22 by placing the screw 56 in a lateral slot parallel to the cutting edge 28.

Figure 4:
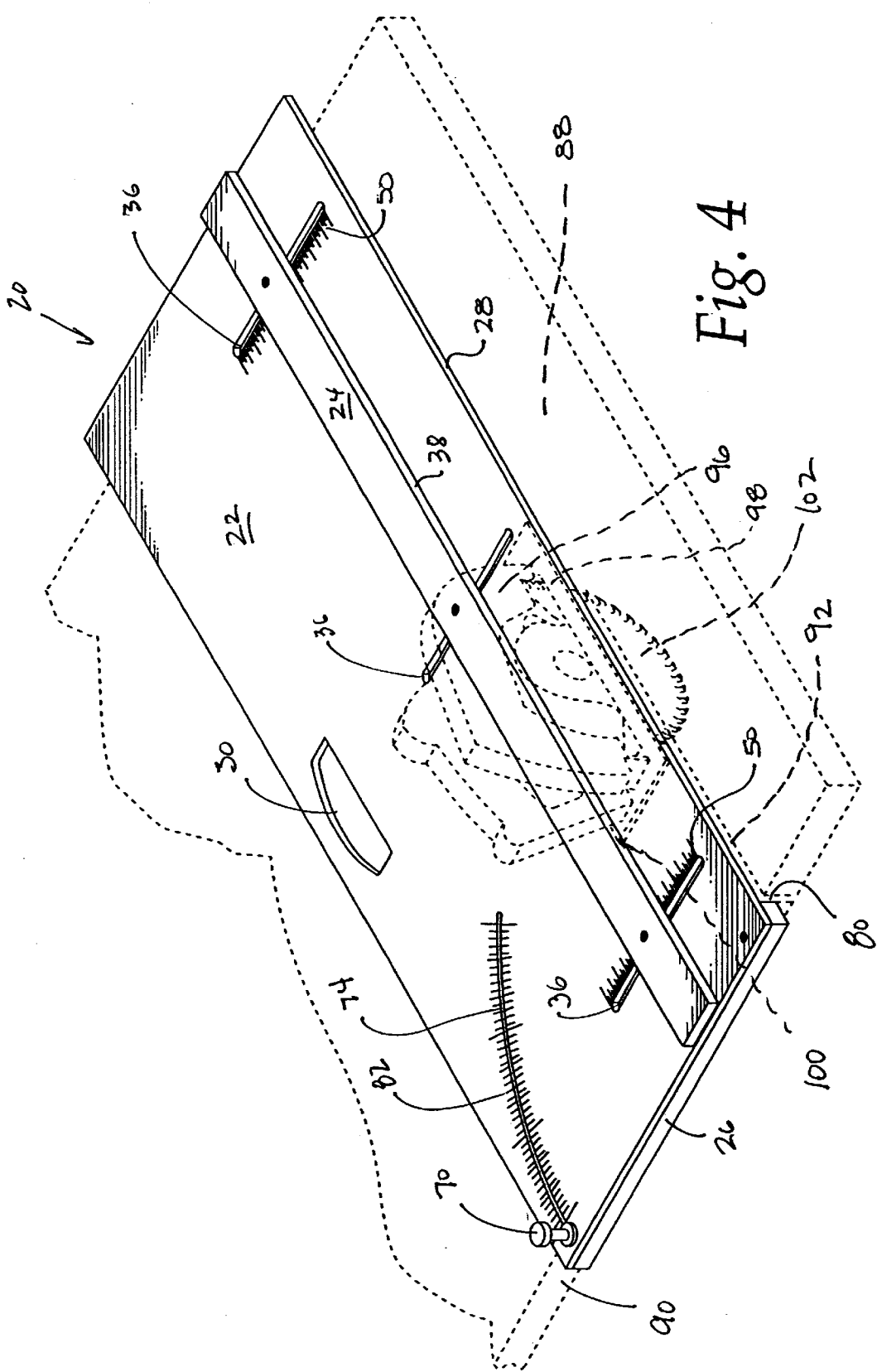
FIG. 4 is a perspective view of a tool guide being used to guide the cut of a circular saw along a panel at a right angle to its adjacent edge.

In use, as illustrated in FIG. 4, the tool guide 20 is placed with the base plate 22 flat on the surface of a material 88 to be cut. The inner edge 80 of the control bar 26 is abutted against a control edge 90 of the material 88. In this illustration, the control bar 26 is set at a right angle to the cutting edge 28 and will result in a cut line 92 that is at a right angle to the control edge 90.

A power tool 96 is illustrated as a circular saw, but it could be any portable hand-held power tool such as a jigsaw or router. The power tool 96 includes a platen 98 that rests on the base plate 22 between the tool guide rail 24 and the cutting edge 28. This part of the base plate 22 will protect the material 88 to be cut from being scratched or marred.

The tool guide rail 24 is set parallel to the cutting edge 28 at a distance that is exactly equal to the distance between a platen guide edge 100 and a cutter 102 in the power tool 94. In the illustrated example, the cutter 102 is a circular saw blade, but it could be any cutter or milling bit such as a jigsaw blade or a router bit. This adjustable spacing of the tool guide rail 26 relative to the cutting edge 28 permits the tool guide 20 to be used with a variety of tools, cutters, and cutter sizes without the base plate 22 being cut to conform to each unique tool or cutter. Instead, the adjustment enables the cutting edge 28 to remain constant and always define the exact location where the cut will occur.

To cut a door bottom, for example, at a right angle to the door side, the control bar 26 is set at 90° and the tool guide rail 24 is adjusted to place a cutter at the cutting edge 28. The desired amount of material to be removed is measured and marked at one location and the cutting edge 28 is placed on that mark with the control bar 26 placed firmly against the control edge 90 of the door. The base plate 22 can be clamped down or held by hand while the power tool 96 is placed against the tool guide rail 24. The tool 96 is started and pushed along the tool guide rail 24 from one side of the door to the other to obtain a perfectly trimmed door with a minimum of set up, no material marring, and little if any material splintering because the downward forces on the base plate 22 supports the wood fibers at the cut line to reduce splintering.

Figure 5:
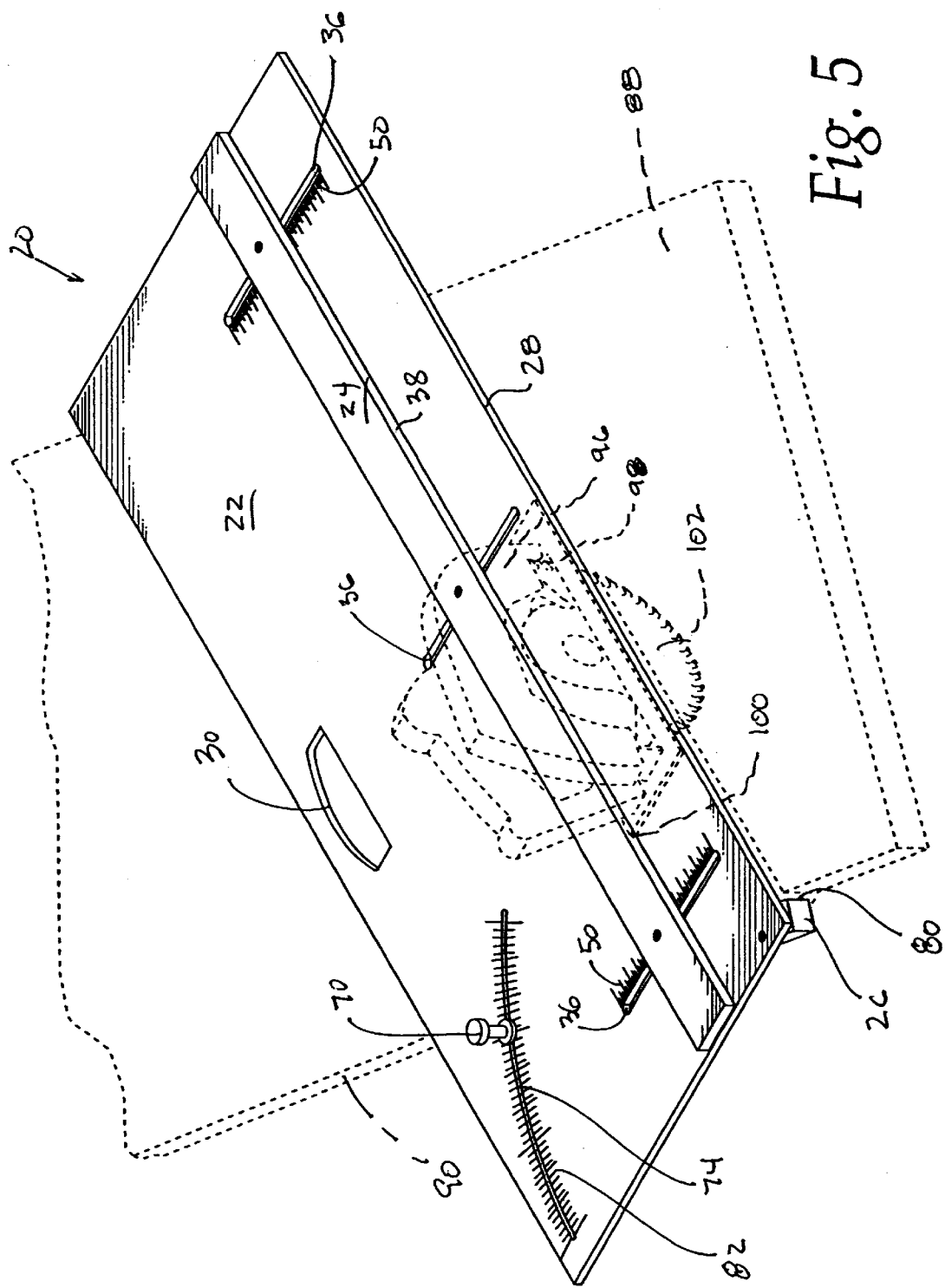
FIG. 5 is a perspective view of a tool guide being used to guide a circular saw to cut at an acute angle to the adjacent edge.

FIG. 5 illustrates the same arrangement as FIG. 4 except that the control bar 26 is adjusted to an acute angle relative to the cutting edge 28. This arrangement will result in a cut line 92 that is at an acute angle relative to the control edge 90 of the material being cut 88.

The foregoing detailed description of the drawings is presented for clearness of understanding only, and no unnecessary limitations there from shall be read into the following claims.

What is claimed is:

1. An adjustable tool guide comprising:
    a base plate defining a cutting edge, a top surface, and a bottom surface;
    a tool guide rail joined to the base plate top surface, and adjustable at a plurality of spacings parallel to the base plate cutting edge to define a tool slide area on which a tool can slide against the tool guide rail and the tool's cutting blade can be disposed adjacent to the base plate cutting edge; and
    a control bar joined to the base plate bottom surface, and adjustable at a plurality of angles relative to the base plate cutting edge.

2. The adjustable tool guide of claim 1, wherein the base plate includes an exposed surface upon which hand pressure may be applied to hold the guide in place during a cutting operation.

3. The adjustable tool guide of claim 1, wherein the control bar has a lower end that is pivotally attached to the base plate.

4. The adjustable tool guide of claim 1, wherein the base plate includes gradations for accurate angle adjustment of the control bar.

* * * * *

UNITED STATES PATENT AND TRADEMARK OFFICE
CERTIFICATE OF CORRECTION

PATENT NO.    : 6,725,558 B2
DATED         : April 27, 2004
INVENTOR(S)   : Gompper et al.

It is certified that error appears in the above-identified patent and that said Letters Patent is hereby corrected as shown below:

<u>Title page,</u>
Item [76], Inventors, "Gommper" should read -- Gompper --

Signed and Sealed this

Twenty-seventh Day of July, 2004

JON W. DUDAS
*Acting Director of the United States Patent and Trademark Office*